Jan. 6, 1931.　　　R. C. U. VESSOT　　　1,788,001
SHAKER MECHANISM
Filed July 20, 1929　　　2 Sheets-Sheet 1

INVENTOR
ROBERT CHARLES ULYSSES VESSOT
BY Fetherstonhaugh&Co.
ATTORNEYS

Jan. 6, 1931.  R. C. U. VESSOT  1,788,001
SHAKER MECHANISM
Filed July 20, 1929   2 Sheets-Sheet 2
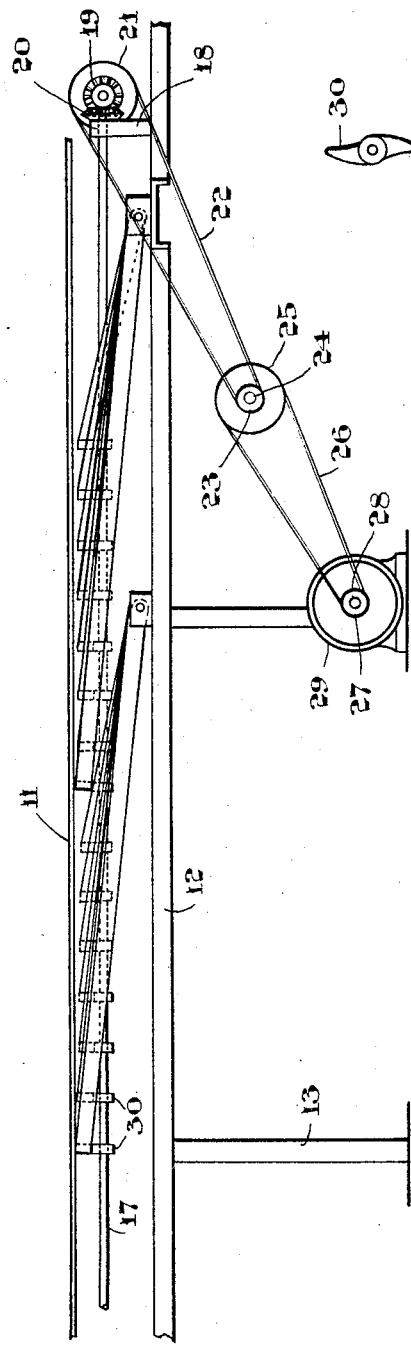
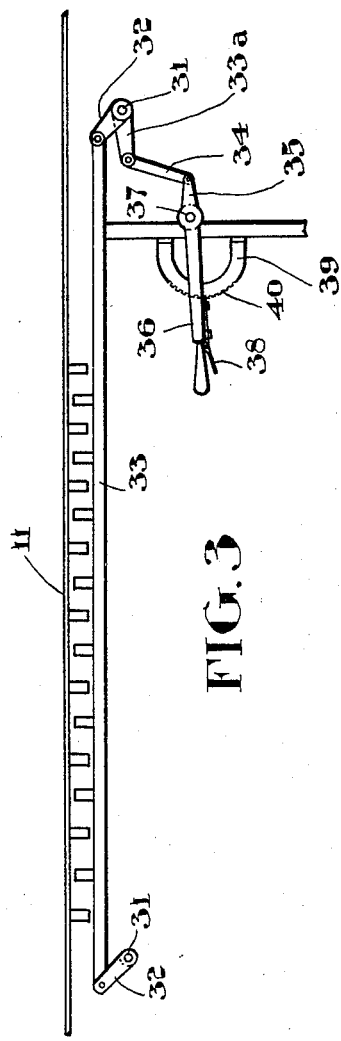
INVENTOR
ROBERT CHARLES ULYSSES VESSOT
BY Featherstonhaugh & Co.
ATTORNEYS Patented Jan. 6, 1931

1,788,001

UNITED STATES PATENT OFFICE

ROBERT CHARLES ULYSSES VESSOT, OF MONTREAL, QUEBEC, CANADA

SHAKER MECHANISM

Application filed July 20, 1929. Serial No. 379,808.

This invention relates to new and useful improvements in shaking mechanism and particularly to mechanism used in the manufacture of shaped candies, chocolates and the like and the main object of the invention is to provide simple and easily adjusted mechanism for shaking the carrier belt of a conveyor upon which is loaded moulds or drops of candy, so that the said candy or chocolate will take a definite shape before being delivered from the conveyor.

According to my invention, I provide a conveyor belt adapted to support candy mounds or drops of candy. The belt moves comparatively slow and beneath said belt is pivotally mounted a plurality of sets of shaker bars which are operated by means of cams to raise the bars so that they tap the under side of the conveyor belt. This tapping shakes the belt so that candy or chocolate in its molten state will fill the mould and assume the shape thereof.

In the drawings which illustrate my invention,

Figure 2 is a side elevation of the machine showing the position of the conveyor belt and a portion thereof.

Figure 3 is a side elevation of the shaker adjusting mechanism.

Figure 4 is a sectional end elevation of a cam shaft showing the position of the cams.

Figure 1:
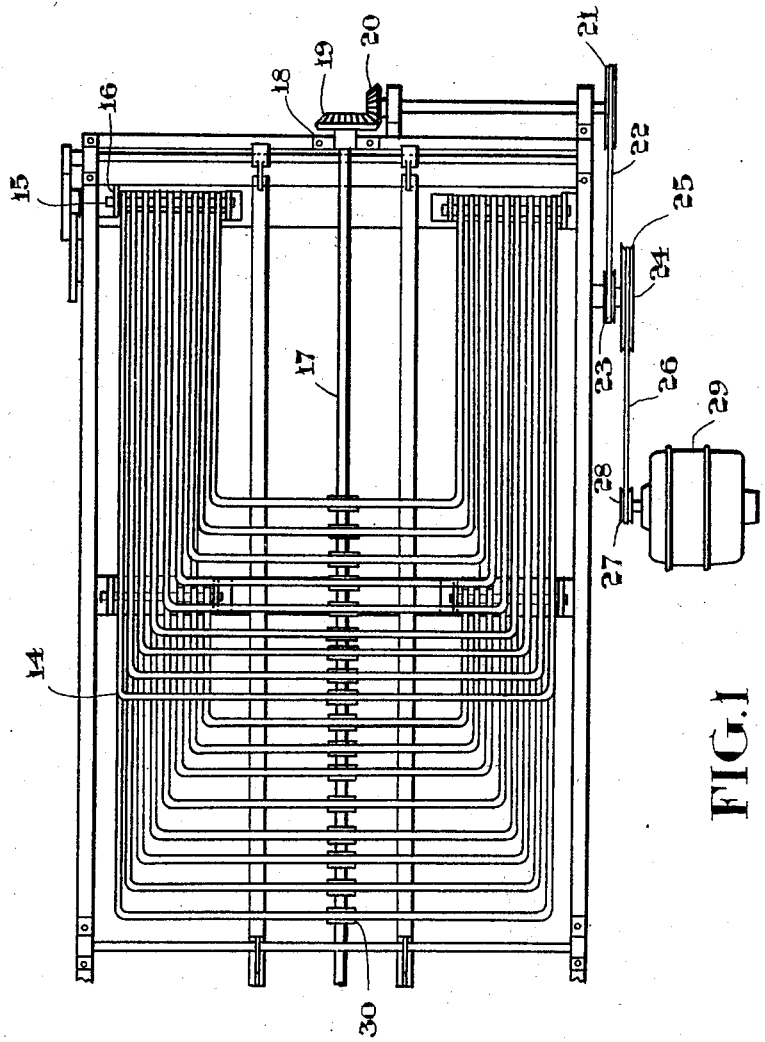
Figure 1 is a plan view of the shaker mechanism with the belt removed.

Referring more particularly to the drawings, 11 designates a conveyor used for the conveying of chocolate, candy, or like moulds. In the drawing, only a part of the belt is shown and its thickness is slightly exaggerated to simplify the reading of the drawing. The belt is mounted above a frame 12 supported on suitable legs 13 adapted to support the shaker mechanism hereinafter described.

In the drawings, two sets of shakers are shown but this number may be increased or decreased according to the class of candy or chocolate being manufactured.

Each set of shaker mechanism consists of a plurality of U-shaped members 14 mounted on pivot pins 15 passing through brackets 16 secured to the frame. As will be seen from Figure 1, these U-shaped members are similar in shape and of gradually increasing size, the bar nearest the pivot being the smallest while the bar furtherest from the pivot is the largest. The sets are so arranged that the bottom part of the smallest U-shaped member of one set lies in proximity to the bottom part of the largest U-shaped member of the adjacent set, so that the pivot of the said smallest bar lies beneath the bars of the said adjacent set. In plan it will be seen that the parts of the member extending transversely of the belt are preferably spaced equidistant from one another in the longitudinal or travelling direction of the belt. Extending below and longitudinally of the machine is the cam shaft 17. This shaft is rotatably mounted on suitable bearings 18 and has secured to one end a bevel toothed wheel 19 adapted to mesh with the teeth of a bevel toothed wheel 20 secured to a shaft extending in the transverse direction of the machine. The shaft is rotatably mounted on bearings and has secured thereto a pulley 21 driven by a flexible element 22 from a pulley 23. This pulley 23 is secured to a shaft 24 having another pulley 25 secured thereto driven by a flexible member 26 from a pulley 27 secured to the armature shaft 28 of a motor 29, or other driving element.

The above description is of one type of cam shaft rotating mechanism but it will be readily understood that other types of cam rotating mechanism may be used. The cam shaft has formed thereon or secured thereto a plurality of cam shaped portions 30. There is one of such portions positioned beneath each shaker bar and preferably centrally thereof. These cam portions are preferably angularly disposed to one another as shown in Figure 4 of the drawings, so that on rotation of the cam shaft the bars are raised alternately to contact with the underside of the conveyor belt to tap same and cause a shaking thereof. The belts carry chocolate or candy moulds, into which plastic candy or chocolate is placed. This tapping causes the chocolate to pack into the mould and spread itself so that the product delivered from the machine is the exact shape of the mould. The device may be also used for making flat circular candies or chocolate drops, as drops of chocolate or candy fed onto the belt and subjected to the shaking action, flatten out and assume flat circular or disc shapes. To regulate the rise and fall of the bars, regulating mechanism is supplied as shown in Figure 3. This consists of a pair of rotatably mounted shafts 31 extending transversely of the machine and spaced longitudinally from one another. Each shaft has preferably secured thereto a pair of levers 32 connected together by links 33, said links being adapted to be moved toward or away from the underside of the shaker bars. One of said shafts 31 extends outwardly from the side of the machine and is fitted with a lever 33a connected by a link 34 to the extension 35 of a hand lever 36 rotatably mounted in bearings 37 secured to the frame. This lever is provided with the usual trigger mechanism 38 which engages with the teeth 40 of a quadrant 39 secured to the frame. By moving the hand lever and operating the trigger mechanism the upward movement of the shaker may be controlled, as the effective movement of the bars is controlled by their upward movement. It will be seen that should the candy or chocolate be of the stiff variety, the effective movement of the shaker bars may be made comparatively large by lowering the links 33 and by raising said links the effective movement of the shaker bars may be made comparatively small for use with soft plastic candies or chocolates.

The device is simple in operation and provides an effective means to shake confections so that they assume a desired shape or form as they are being conveyed from one part of the factory to another.

Having thus described my invention, what I claim is:

1. In shaker mechanism for confectionery a conveyor belt adapted to support and convey the confectionery, a series of substantially U-shaped members pivotally secured to a frame below the belt, a cam shaft positioned below said U-shaped members, and a plurality of cams carried by said shaft to co-operate with the bight portions of the U-shaped members, whereby said members are alternately raised and lowered during rotation of the shaft.

2. In shaker mechanism for confectionery a frame, a conveyor belt mounted thereabove adapted to carry confectionery in its plastic state, a plurality of sets of shaker bars, each set comprising a plurality of substantially U-shaped bars mounted on a common pivot pin, and a cam shaft having a plurality of cams thereon adapted to raise the bars to contact with the underside of the belt.

3. A device according to claim 2 having means to regulate the effective rise of the bars.

4. In a shaker mechanism for confectionery a frame, a conveyor belt mounted above the frame and adapted to carry a confectionery in its plastic state, a plurality of nested members pivotally secured to said frame about a common pivot pin and means for adjustably raising and lowering said nested members within defined limits for a purpose specified.

5. In a shaker mechanism for confectionery, a frame, a conveyor belt mounted above the frame and adapted to carry a confection, a plurality of tapping members of varying lengths pivotally secured to a common pivot pin, and a plurality of cams in spaced relation, each of said cams being adapted to engage a tapping member for a purpose specified.

In witness whereof, I have hereunto set my hand.

ROBERT CHARLES ULYSSES VESSOT.